United States Patent Office 3,414,577
Patented Dec. 3, 1968

3,414,577
QUATERNARY AMMONIUM SALTS
OF AJMALINE
Johannes Keck, Biberach an der Riss, Germany, assignor to Boehringer Ingelheim G.m.b.H., Ingelheim am Rhein, Germany, a corporation of Germany
No Drawing. Continuation-in-part of application Ser. No. 384,765, July 23, 1964, which is a continuation-in-part of application Ser. No. 244,872, Dec. 17, 1962. This application Oct. 7, 1965, Ser. No. 493,932
Claims priority, application Germany, Jan. 10, 1962,
T 21,400
11 Claims. (Cl. 260—294.7)

ABSTRACT OF THE DISCLOSURE

Novel quaternary ammonium salts of ajmalines having anti-arrythmia activity in warm-blooded animals.

This application is a continuation-in-part application of application Ser. No. 384,765, filed July 23, 1964, now abandoned, which in turn is a continuation-in-part application of application Ser. No. 244,872, filed Dec. 17, 1962, now abandoned.

More particularly, the present invention relates to quaternary ammonium salts of ajmaline of the formula

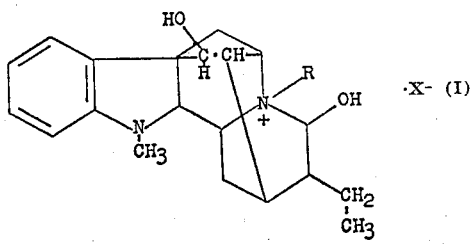

and their tautomers of the formula

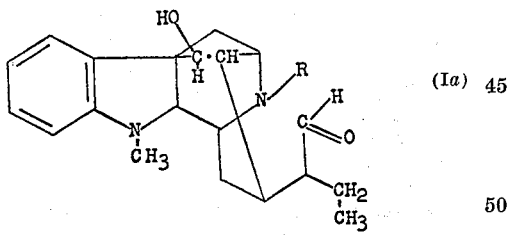

wherein

R is a branched or straight chain aliphatic hydrocarbon of 3 to 5 carbon atoms, preferably alkyl, alkenyl or alkynyl of 3 carbon atoms, that is, propyl, allyl or propargyl, and X is halogen or the anion of an acid, especially of sulfuric acid, phosphoric acid, tartaric acid, maleic acid, citric acid, oxalic acid, succinic acid, glutaric acid, fumaric acid, adipic acid, or an aromatic sulfonic acid, preferably p-toluene-sulfonic acid.

The quaternary ammonium salts of ajmaline according to the present invention, that is, the compounds of the Formula I above, may be prepared by various methods which are well known in principle for the preparation of quaternary ammonium salts of organic amines. However, I have found that it is most advantageous and convenient to prepare the quaternary ammonium salts in the present instance by reacting ajmaline with a quaternizing agent of the formula

RX'     (II)

wherein

R has the same meanings as in Formula I and
X is halogen or an aromatic sulfonyl group.

In this quaternization reaction the ajmaline and the quaternizing agent II are advantageously used in equimolar amounts, but the quaternizing agent may also be provided in excess over the stoichiometric amount. The quaternizing reaction is preferably performed in the presence of an inert organic solvent, such as chloroform, methanol, nitromethane, acetonitrile, benzyl alcohol, dimethylformamide and the like, at temperatures between 0 and 100° C., preferably at the boiling point of the inert organic solvent, if one is used. The quaternizing agent RX may also serve as the solvent for the reaction if it is provided in substantial excess over the stoichiometric amount; in that case the reaction is preferably carried out at the boiling point of compound RX.

When the quaternary ammonium salts of the Formula I are admixed with an aqueous alkali, such as sodium hydroxide, sodium carbonate, sodium bicarbonate, ammonia and the like, their tautomeric aldehyde bases of the Formula Ia above are formed. The tautomeric aldehyde bases can be recovered from the alkaline solution by extraction with a water-immiscible inert organic solvent, such as chloroform, benzene or ether, and evaporating the solvent from the extract solution. When the tautomeric aldehyde bases are admixed with an acid, such as a hydrogen halide or any of the acids included in the definition of X above, preferably in the presence of an inert solvent, such as methanol, acetone, tetrahydrofuran or the like, the quaternary ammonium salts I are formed again. In other words, a tautomeric equilibrium exists between the quaternary salts I and the aldehyde bases Ia, whose direction of shift depends upon the pH of the environment. The quaternary ammonium salts I crystallize out of solution immediately or after evaporating a portion of the solvent.

The following examples further illustrate the present invention and will enable others skilled in the art to understand it more completely. It should be understood, however, that the present invention is not limited to the particular examples given below.

EXAMPLE 1

Preparation of N-(b)-allyl-ajmalinium-bromide 1 gm. of ajmaline was dissolved in 4 cc. of chloroform, and 1 cc. of allyl bromide was added to the resulting solution. The reaction mixture thus obtained was allowed to stand for 24 hours at room temperature. Thereafter, the clear reaction solution was briefly cooled to a temperature below 0° C., whereby crystallization set in. The crystals were filtered off and were then recrystallized from a mixture of absolute methanol and absolute ether. The purified colorless crystalline product was identified to be N-(b)-allyl-ajmalinium-bromide having a melting point of 252–254° C.

EXAMPLE 2

Preparation of N-(b)-n-propyl-ajmalinium-bromide 8 gm. of ajmaline were dissolved in 50 cc. of acetonitrile, and 8 cc. of n-propyl-bromide were added to the solution. The resulting reaction solution was refluxed for six hours, whereby a colorless precipitate was formed. The precipitate was separated by vacuum filtration, washed with acetonitrile and absolute ether and dried. For further purification the raw product was recrystallized from a mixture of absolute methanol and absolute ether. The purified crystalline product was identified to be N-(b)-n-propyl-ajmalinium-bromide having a melting point of 275–278° C.

This quaternary ajmalinium compound was dissolved in dilute aqueous sodium hydroxide, and the alkaline solution was extracted with chloroform. The chloroform extract solution contained the aldehyde base of the formula:

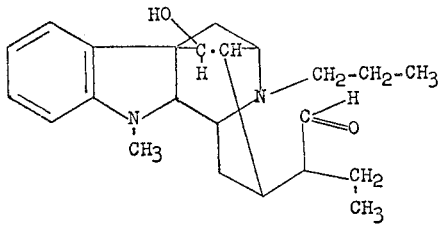

The structure of the compound was ascertained by I.R.-spectrum analysis, which showed a carbonyl band at 5.83μ, as well as by nuclear magnetic resonance spectrum analysis [NMR-spectrum; see J. N. Shoolery and M. T. Rogers, J.A.C.S. 80, 5121 (1958)], which showed an aldehyde proton at 9.5 p.p.m. (tetramethylsilane=0 p.p.m.).

Upon acidification of the chloroform solution with hydrogen bromide, N-(b)-n-propyl-ajmalinium-bromide was obtained again.

EXAMPLE 3

Preparation of N-(b)-sec.amyl-ajmalinium-iodide 1 gm. of ajmaline was dissolved in 3 cc. of absolute chloroform, and 1 cc. of sec.amyl-iodide was added to the solution. The resulting reaction solution was refluxed for ninety hours, whereby a precipitate was formed. The precipitate was separated by filtration, and was dissolved in absolute methanol. The methanol solution was boiled for a short time with activated charcoal, filtered, and the filtrate was admixed with absolute ether until crystallization began. The crystalline product thus obtained was separated and identified to be N-(b)-sec.amyl-ajmalinium-iodide having a melting point of 238–240° C.

EXAMPLE 4

Preparation of N-(b)-propargyl-ajmalinium-chloride

Using a procedure analogous to that described in Example 1, N-(b)-propargyl-ajmalinium-chloride was prepared from ajmaline and propargyl chloride. The product had a melting of 176–178° C.

EXAMPLE 5

Preparation of N-(b)-n-butyl-ajmalinium-bromide

Using a procedure analogous to that described in Example 2, N-(b)-n-butyl-ajmalinium-bromide was prepared from ajmaline and n-butyl-bromide. The product had a melting point of 268–271° C.

EXAMPLE 6

Preparation of N-(b)-n-pentyl-ajmalinium-iodide

Using a procedure analogous to that described in Example 3, N-(b)-n-pentyl-ajmalinium-iodide was prepared from ajmaline and n-pentyl iodide. The product had a melting point of 248–250° C.

EXAMPLE 7

Preparation of N-(b)-n-propyl-ajmalinium-p-toluene sulfonate 5 gm. of ajmaline were dissolved in 20 cc. of acetonitrile, and the resulting solution was admixed with 4 gm. of p-toluene-sulfonic acid propyl ester. The reaction solution thus obtained was maintained under gentle reflux for sixty hours. Thereafter, it was evaporated to dryness in vacuo, leaving a slightly colored resin as a residue. The residue was admixed with absolute ether, whereby an amorphous product was formed, which was separated by vacuum filtration and dried in a desiccator. The raw product was recrystallized several times from dioxane, yielding a colorless crystalline substance which was identified to be N-(b)-n-propyl-ajmalinium-p-toluene sulfonate. It had a melting point of 129–133° C.

EXAMPLE 8

75 gm. of N-(b)-n-propyl-ajmalinium bromide were suspended in 3 liters of an aqueous saturated solution of sodium bicarbonate, and the suspension was admixed with 3 liters of chloroform. The resulting mixture was vigorously stirred for six to eight hours. Thereafter, the chloroform phase was separated and evaporated to dryness. 68 gm. of a yellow syrup remained as a residue, which was identified to be the aldehyde base of the formula shown in Example 2. The aldehyde base was dissolved in about 150 cc. of acetone and, while stirring and cooling on an ice bath, the solution was slowly admixed with a solution of 25 gm. of tartaric acid in 2 liters of acetone. The fine white precipitate formed thereby was separated by vacuum filtration, washed with ether and dried. The raw product, weighing 80 gm. was recrystallized once from a mixture of ethanol and ether, yielding 50 gm. of N-(b)-n-propyl-ajmalinium hydrogen tartrate having a melting point of 149–152° C. (decomposition).

In analogous fashion N-(b)-n-propyl-ajmalinium dihydrogen phosphate was obtained with phosphoric acid in place of tartaric acid.

EXAMPLE 9

9 gm. of the aldehyde base of the formula shown in Example 2, prepared in the same manner as in Example 8, and 3.8 gm. of oxalic acid were dissolved in about 70 cc. of warm ethanol, the resulting solution was admixed with ether until it turned cloudy, and the mixture was allowed to stand for several hours at room temperature. About 9.5 gm. of a colorless crystalline substance separated out during that time. The precipitate was separated by vacuum filtration, dried, and recrystallized twice from a mixture of ethanol and ether. The colorless product, having a melting point of 139–143° C., was identified to be N-(b)-n-propyl-ajmalinium hydrogen oxalate.

EXAMPLE 10

0.5 gm. of the aldehyde base of the formula shown in Example 2, prepared in the same manner as in Example 8, was dissolved in about 10 cc. of ethanol, and the resulting solution was admixed with 2.72 cc. of 0.1 N sulfuric acid. The solution mixture thus obtained was heated to 50° C. for a short period of time, then admixed with ether until it began to turn cloudy and finally placed into a cooling chest for crystallization. The crystalline precipitate formed thereby was separated by vacuum filtration, dried and recrystallized from a mixture of ethanol and ether. The product, having a melting point of 279–283° C. (decomposition), was identified to be N-(b)-n-propyl-ajmalinium hydrogen sulfate.

The compounds according to the present invention, that is, the quaternary ajmalinium salts of the Formula I and their tautomeric aldehyde bases of the Formula Ia, have useful pharmacodynamic properties. More particularly, the compounds of the invention exhibit analgesic and antipyretic activities and are especially useful in relieving cardiac arrythmia in warm-blooded animals.

For pharmacological purposes, the compounds of the present invention are preferably administered to warm-blooded animals perorally or parenterally as active ingredients in dosage unit compositions, that is, compositions consisting essentially of an inert, physiologically compatible pharmaceutical carrier having one dosage unit of the active ingredient dispersed therethrough, such as tablets, coated pills, hypodermic solutions, suppositories, gelatin capsules, drops, syrups, and the like. The effective single dosage unit range of the compounds of the invention is from 1.0 to 20.0 mgm., preferably 5.0 to 10.0 mgm.

The following examples illustrate various dosage unit compositions comprising a compound according to the present invention as an active ingredient. The parts are parts by weight unless otherwise specified.

EXAMPLE 11

Hypodermic solution

The hypodermic solution is compounded from the following ingredients:

N-(b)-n-propyl-ajmalinium-bromide ____ parts__ 5.0
1,2-propyleneglycol _____ parts by vol__ 1000.0
Distilled water, q.s. ad parts by vol. 2000.0.

Compounding procedure: A mixture of the 1,2-propyleneglycol and some of the water is heated to 80° C., and the ajmalinium compound is dissolved therein. The resulting solution is cooled and diluted with the remainder of the water to the desired volume. The finished solution is then filtered until free from fibers, filled into 2 cc. ampules, and the ampules are sterilized by sterile filtration. Each 3 cc. of solution contain 5 mgm. of active ingredient.

EXAMPLE 12

Tablets

The tablet composition is compounded from the following ingredients:

| | Parts |
|---|---|
| N-(b)-n-propyl-ajmalinium bromide | 10.0 |
| Lactose | 70.0 |
| Potato starch, dry | 35.0 |
| Soluble starch | 4.0 |
| Magnesium stearate | 1.0 |
| Total | 120.0 |

Compounding procedure: The ajmalinium compound, the lactose and the potato starch are admixed with each other, and the resulting mixture is granulated by moistening it with an aqueous 20% solution of the soluble starch and passing the moistened mass though a 1 mm.-mesh screen. The moist granulate is dried at 40° C. and is again forced through the screen. The magnesium stearate is blended into the granulate, and the resulting mixture is pressed into 120 mgm. tablets. Each tablet contains 10 mgm. of the active ingredient.

EXAMPLE 13

Coated pills

The tablets obtained in Example 12 are provided with a thin shell consisting essentially of sugar and talcum. The coated pills are then polished with beeswax.

EXAMPLE 14

Suppositories

The suppositories are compounded from the following ingredients:

| | Parts |
|---|---|
| N-(b)-n-propyl-ajmalinium-bromide | 20.0 |
| Cocoa butter | 1680.0 |
| Total | 1700.0 |

Compounding procedure: The finely powdered ajmalinium compound is stirred into the molten cocoa butter at about 37° C., and the mixture is homogenized. The mixture is then poured into cooled suppository molds holding 1700 mgm. of the mixture. Each suppository contains 20 mgm. of the active ingredient.

EXAMPLE 15

Gelatin capsules

The contents of the capsules are compounded from the following ingredients:

| | Parts |
|---|---|
| N-(b)-n-propyl-ajmalinium-bromide | 10.0 |
| Lactose | 90.0 |
| Total | 100.0 |

Compounding procedure: The ajmalinium compound and the lactose are uniformly admixed with each other, and the mixture is filled into gelatin capsules, each holding 100 mgm. of the mixture. Each capsule contains 10 mgm. of the active ingredient.

EXAMPLE 16

Syrup

The syrup is compounded from the following ingredients:

| | Parts |
|---|---|
| N-(b)-n-propyl-ajmalinium-bromide | 0.1 |
| Crystalline sugar | 25.0 |
| p-Hydroxy-benzoic acid methyl ester | 0.08 |
| p-Hydroxy-benzoic acid propyl ester | 0.02 |
| Saccharin sodium | 0.1 |
| Vermouth flavoring | 2.7 |
| 1,2-propyleneglycol | 30.0 |

Distilled water, q.s. ad 100.0 parts by vol.

Compounding procedure: The 1,2-propyleneglycol and about 30 parts by volume of the distilled water are admixed with each other, and the p-hydroxy-benzoic acid esters and the ajmalinium compound are dissolved in the mixture (Solution A). The crystalline sugar is dissolved in 20 parts by volume of the distilled water while warming, the resulting syrup is strained, and the vermouth flavoring is added (Solution B). Cooled Solution A is stirred into Solution B, the combined solution is diluted with the remainder of the distilled water to 100 parts by volume, and the finished syrup is filtered until free from suspended matter. 10 cc. of the syrup contain 10 mgm. of the active ingredient.

EXAMPLE 17

Hypodermic solution

The solution is compounded from the following ingredients:

N-(b)-n-propyl-ajmalinium hydrogen tartrate parts__ 5.0
1,2-propyleneglycol _____parts by vol__ 1000.0
Distilled water, q.s. ad 2000.0 parts by vol.

The compounding procedure is the same as in Example 11.

EXAMPLE 18

Tablets

The tablet composition is compounded from the following ingredients:

| | Parts |
|---|---|
| N-(b)-n-propyl-ajmalinium hydrogen sulfate | 10.0 |
| Lactose | 70.0 |
| Potato starch, dry | 35.0 |
| Soluble starch | 4.0 |
| Magnesium stearate | 1.0 |
| Total | 120.0 |

The compounding procedure is the same as in Example 12.

EXAMPLE 19

Suppositories

The suppository composition is compounded from the following ingredients:

| | Parts |
|---|---|
| N-(b)-n-propyl-ajmalinium hydrogen tartrate | 20.0 |
| Cocoa butter | 1680.0 |
| Total | 1700.0 |

The compounding procedure is the same as in Example 14.

EXAMPLE 20

Gelatin capsules

The contents of the capsules are compounded from the following composition:

| | Parts |
|---|---|
| N-(b)-n-propyl-ajmalinium hydrogen oxalate | 10.0 |
| Lactose | 90.0 |
| Total | 100.0 |

The compounding procedure is the same as in Example 15.

EXAMPLE 21

Syrup

The syrup is compounded from the following ingredients:

| | Parts |
|---|---|
| N-(b)-n-propyl-ajmalinium hydrogen tartrate | 0.1 |
| Crystalline sugar | 25.0 |
| p-Hydroxybenzoic acid methyl ester | 0.08 |
| p-Hydroxybenzoic acid propyl ester | 0.02 |
| Saccharin sodium | 0.1 |
| Vermouth flavoring | 2.7 |
| 1,2-propyleneglycol | 30.0 |
| Distilled water q.s. ad 100.0 parts by vol. | |

The compounding procedure is the same as in Example 16.

EXAMPLE 22

Drops

The drop solution is compounded from the following ingredients:

| | Parts |
|---|---|
| N-(b)-n-propyl-ajmalinium hydrogen tartrate | 1.0 |
| Saccharin sodium | 1.0 |
| 1,2-propyleneglycol | 15.0 |
| p-Hydroxybenzoic acid methyl ester | 0.035 |
| p-Hydroxybenzoic acid propyl ester | 0.015 |
| Distilled water, q.s. ad 100.0 parts by vol. | |

Compounding procedure: The propyleneglycol and about 80 parts by volume of distilled water are admixed, the mixture is heated to 80° C., and then the p-hydroxybenzoic acid ester and the ajmalinium compound are dissolved therein. The resulting solution is cooled to room temperature, the saccharin sodium is dissolved therein, distilled water is added to bring the solution to the desired volume, and the finished solution is filtered until free from suspended particles. 1 cc. of the solution (about 5 drops) contains 10 mgm. of the active ingredient.

While the above dosage unit composition examples illustrate only three specific N-(b)-n-propyl-ajmalinium salts as active ingredients, it should be understood that any of the other ajmalinium compounds embraced by Formula I or their aldehyde tautomers of the Formula Ia may be substituted as the active ingredient in the illustrative dosage unit compositions. Moreover, the amount of active ingredient in the composition examples above may be varied within the dosage unit limits given above to suit the particular requirements, as may the amounts and nature of the inert ingredients.

PHARMACOLOGICAL DATA

Antiarrythmia effect on isolated guinea pig auricle

The following compounds were tested for their antiarrythmia activity by the method of G. S. Dawes (British Journal of Pharmacology, vol. 1, p. 90 [1946]) using six auricles for each dose of each compound. By electrical stimulation with progressively increasing frequency, the maximal frequency to which the isolated auricle responded with regular contractions was determined. The decrease in the upper limit of the maximal frequency rate under the influence of the test compounds is a measure of their antiarrythmia activity. The results are summarized in Table I:

TABLE I

| Test compound | Concentration | Percent decrease of maximal frequency after— | |
|---|---|---|---|
| | | 10 min. | 20 min. |
| N-(b)-n-propyl ajmaline bromide | $10^{-6}$ | 41 | 60 |
| | $10^{-5}$ | 54 | 70 |
| N-(b)-n-propyl ajmaline hydrogen tartrate. | $10^{-6}$ | 32 | 45 |
| | $10^{-5}$ | 57 | 69 |
| Ajmaline | $10^{-6}$ | 12 | 18 |
| | $10^{-5}$ | 31 | 52 |
| N-(b)-methyl ajmaline iodide | $10^{-6}$ | 12 | 18 |
| | $10^{-5}$ | 38 | 51 |

The data in Table I shows that ajmaline and N-(b)-methyl ajmaline iodide have the same order of antiarrythmia activity while the compounds of the invention are ten times more effective than ajmaline.

Although the present invention has been illustrated with the aid of certain specific embodiments, it will be readily apparent to others skilled in the art that the invention is not limited to these particular embodiments and that various changes and modifications may be made without departing from the spirit of the invention or the scope of the appended claims.

I claim:
1. A compound selected from the group consisting of a quaternary ammonium salt of ajmaline of the formula

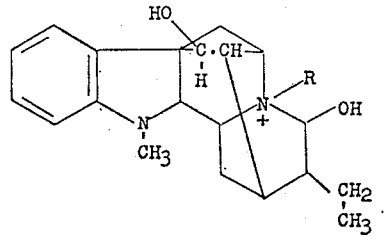

and their aldehyde tautomers of the formula

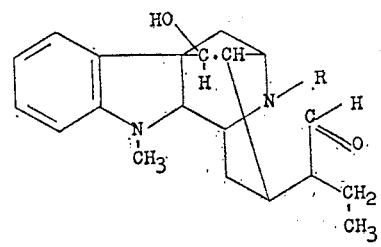

wherein
R is an acyclic hydrocarbon of 3 to 5 carbon atoms, and
X is selected from the group consisting of halogen and the anion of a non-toxic, physiologically acceptable aromatic sulfonic acids.

2. A compound selected from the group consisting of a quaternary ammonium salt of ajmaline of the formula

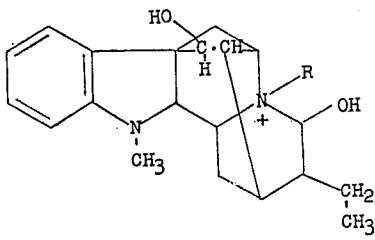

and their aldehyde tautomers of the formula

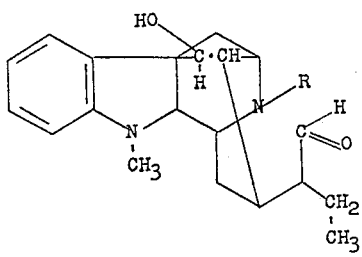

wherein

R is an acyclic hydrocarbon of 3 to 4 carbon atoms, and

X is selected from the group consisting of chlorine, bromine and iodine.

3. A non-toxic, physiologically acceptable acid addition salt of N-(b)-allyl-ajmaline.

4. A non-toxic, physiologically acceptable acid addition salt of N-(b)-propargyl-ajmaline.

5. N-(b)-n-propyl-ajmalinium bromide.
6. N-(b)-allyl-ajmalinium bromide.
7. N-(b)-propargyl-ajmalinium chloride.
8. N-(b)-n-propyl-ajmalinium dihydrogen phosphate.
9. N-(b)-n-propyl-ajmalinium hydrogen oxalate.
10. N-(b)-n-propyl-ajmalinium hydrogen sulfate.
11. An aldehyde tautomer of a quaternary ammonium salt of ajmaline of the formula

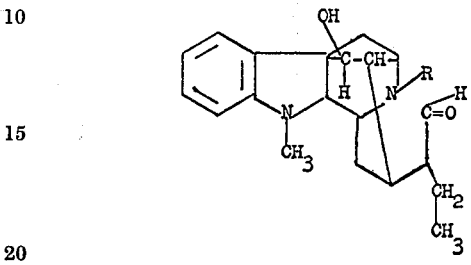

wherein R is an acyclic hydrocarbon of 3 to 5 carbon atoms.

References Cited

UNITED STATES PATENTS 3,133,929  5/1964  Bartlett _____ 260—236
3,169,968  2/1965  Bartlett _____ 260—236

OTHER REFERENCES

Siddiqui et al.: Journ. Indian Chem. Soc., vol. 9 (1932), pp. 542 and 543.

Siddiqui et al.: Pakistan Journ. of Scientific and Indust. Res. (1959), pp. 86–88.

JAMES A. PATTEN, *Primary Examiner.*